US011135926B2

United States Patent
Lee et al.

(10) Patent No.: US 11,135,926 B2
(45) Date of Patent: Oct. 5, 2021

(54) SYSTEM AND METHOD FOR CONTROLLING CHARGING OF PLUG-IN VEHICLE

(71) Applicants: Hyundai Motor Company, Seoul (KR); Kia Motors Corporation, Seoul (KR)

(72) Inventors: Sang-Kyu Lee, Gyeonggi-do (KR); Gyu-Hong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 437 days.

(21) Appl. No.: 15/898,290

(22) Filed: Feb. 16, 2018

(65) Prior Publication Data
US 2018/0236892 A1     Aug. 23, 2018

(30) Foreign Application Priority Data
Feb. 20, 2017    (KR) ........................ 10-2017-0022318

(51) Int. Cl.
*B60L 53/14*      (2019.01)
*B60L 11/18*      (2006.01)
(Continued)

(52) U.S. Cl.
CPC ............. *B60L 53/14* (2019.02); *B60L 1/003* (2013.01); *B60L 3/0046* (2013.01);
(Continued)

(58) Field of Classification Search
CPC .......... H02J 7/00; H02J 7/0021; H02J 7/0022; H02J 7/0026; B60W 20/00; B60W 20/13;
(Continued)

(56) References Cited

U.S. PATENT DOCUMENTS 6,903,534 B2 *   6/2005   Minamiura ......... H01M 10/482
                                                                       320/137
7,975,757 B2 *   7/2011   Nemesh ............. B60H 1/00278
                                                                       165/42

(Continued)

FOREIGN PATENT DOCUMENTS

JP         2002190326 A       7/2002
JP         2004171795 A       6/2004
(Continued)

*Primary Examiner* — Anthony R Jimenez
(74) *Attorney, Agent, or Firm* — Mintz Levin Cohn Ferris and Popeo, P.C.; Peter F. Corless

(57) ABSTRACT

A system and method for controlling charging of plug-in vehicle are provided to charge a high-voltage battery mounted in the vehicle by converting AC power into DC power using an OBC. The method includes determining whether the high-voltage battery is charged by the operation of the OBC and whether the temperature of the high-voltage battery is greater than a predetermined reference cooling temperature while the high-voltage battery is charged to determine whether to cool the high-voltage battery. Additionally, whether the temperature of the high-voltage battery is greater than a predetermined failure determination temperature is determined to determine whether the high-voltage battery is abnormal when the temperature of the high-voltage battery is greater than the reference cooling temperature. A battery cooling fan mounted in the vehicle is maximally driven to cool the high-voltage battery when the temperature of the high-voltage battery is greater than the failure determination temperature.

18 Claims, 2 Drawing Sheets

(51) Int. Cl.
*B60L 58/26* (2019.01)
*B60L 1/00* (2006.01)
*B60L 3/00* (2019.01)
*B60L 50/60* (2019.01)

(52) U.S. Cl.
CPC ........... *B60L 11/1874* (2013.01); *B60L 50/60* (2019.02); *B60L 58/26* (2019.02); *B60L 2240/545* (2013.01); *Y02T 10/70* (2013.01); *Y10S 903/903* (2013.01)

(58) Field of Classification Search
CPC ........ G05D 23/00; G05D 23/01; G05D 23/19; G05D 23/1927; H01M 2220/00; H01M 2220/20; H01M 10/60; H01M 10/61; H01M 10/613; H01M 10/625; H01M 10/63; H01M 10/633; H01M 10/635; H01M 10/651; H01M 2200/00; H01M 2200/10; Y10S 903/903; Y10T 10/70; B60L 53/00; B60L 53/14; B60L 50/00; B60L 50/60; B60L 58/00; B60L 58/10; B60L 58/24; B60L 58/26; B60L 58/30; B60L 58/33; B60L 1/003; B60L 3/0046; B60L 11/1874; B60L 2240/00; B60L 2240/36; B60L 2240/54; B60L 2240/545

USPC .......................................................... 701/22
See application file for complete search history.

(56) References Cited

U.S. PATENT DOCUMENTS

| | | | |
|---|---|---|---|
| 8,620,506 B2 * | 12/2013 | Kummer ............. | H01M 10/625 701/22 |
| 2004/0100225 A1 * | 5/2004 | Neil ........................ | B60L 58/13 320/109 |
| 2007/0089442 A1 * | 4/2007 | Tsuchiya ................. | B60L 1/003 62/186 |
| 2007/0298316 A1 * | 12/2007 | Yamamoto ........ | H01M 10/6563 429/62 |

FOREIGN PATENT DOCUMENTS

| | | | | |
|---|---|---|---|---|
| JP | 2004171796 | A | 6/2004 | |
| JP | 2006014453 | A | 1/2006 | |
| KR | 10-2014-0082896 | A | 7/2014 | |
| KR | 2014-0147171 | A | 12/2014 | |
| KR | 20150067842 | A | 6/2015 | |
| WO | WO-2009102014 | A1 * | 8/2009 | .......... H01M 10/613 |

* cited by examiner

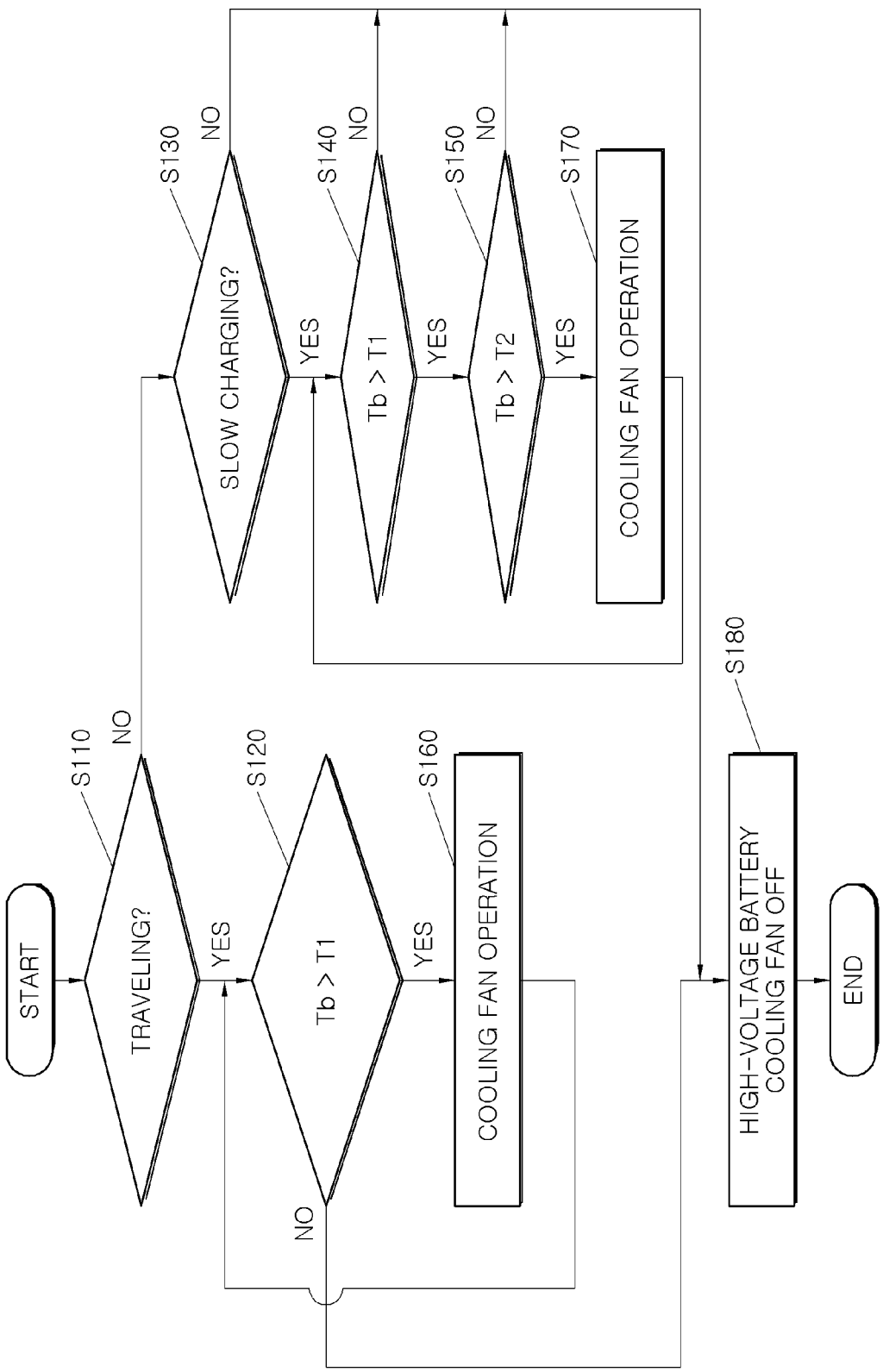

SYSTEM AND METHOD FOR CONTROLLING CHARGING OF PLUG-IN VEHICLE

CROSS-REFERENCE TO RELATED APPLICATIONS

This application claims priority to Korean Patent Application No. 10-2017-0022318, filed on Feb. 20, 2017, which is incorporated herein by reference in its entirety.

BACKGROUND

Field of the Invention

The present invention relates to a system and method for controlling charging of a plug-in vehicle, which controls the operation of a cooling fan for cooling a high-voltage battery to improve charging efficiency in a plug-in vehicle.

Description of Related Art

Generally, plug-in vehicles such as plug-in hybrid vehicles or electric vehicles are driven by high-voltage batteries that are mounted therein and charged in advance. As one of the methods for charging the plug-in vehicles, a high-voltage battery mounted in a vehicle is charged by converting alternating current (AC) power into direct current (DC) power using an on-board charger (OCB). For example, when an OBC 22 is connected to an AC power source, the OBC charges a high-voltage battery 10 by converting AC power into DC power having current and voltage suitable to charge the high-voltage battery 10, as illustrated in FIG. 1.

When the temperature of the high-voltage battery 10 exceeds a predetermined temperature while the high-voltage battery 10 is charged by the OBC 22, a battery cooling fan 31 is operated to cool the high-voltage battery 10. However, the high-voltage battery 10 is charged to about a tenth of maximum power when it is charged by the OBC 22. Accordingly, when the high-voltage battery 10 is charged by the OBC 22, the temperature of the high-voltage battery 10 is not substantially increased. In other words, when the high-voltage battery 10 is charged at a temperature over a certain level by the OBC 22, the temperature of the high-voltage battery 10 is gradually decreased even without the operation of the battery cooling fan 31.

However, when the high-voltage battery 10 reaches a certain level of temperature in the conventional plug-in vehicle, the battery cooling fan 31 is required to be driven to cool the high-voltage battery 10 by cooling air supplied thereto. A portion P4 of electric power P2 output from the OBC 22 is supplied to the battery cooling fan 31 through a low DC-DC converter (LDC), which supplies electric power to an electric load 32 of the vehicle, and hence the electric power P2 output from the OBC 22 is not effectively used to charge the high-voltage battery 10. In other words, the electric power P1 input to the OBC from the AC power source is converted into and output as the electric power P2, and only electric power P3, except for electric power P4 used to drive the battery cooling fan 31, is used to charge the high-voltage battery 10. Accordingly, there is a problem of low charging efficiency and a slow charging rate.

SUMMARY

An exemplary embodiment of the present invention is directed to a system and method for controlling charging of a plug-in vehicle, which is capable of improving charging efficiency by driving a battery cooling fan when the temperature of a high-voltage battery exceeds a failure determination temperature while a plug-in vehicle is slowly charged. Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, a method for controlling charging of a plug-in vehicle may be performed to charge a high-voltage battery mounted in a plug-in vehicle by converting AC power into DC power using an OBC, and the method may include determining whether the high-voltage battery is charged by the operation of the OBC, determining whether the temperature of the high-voltage battery is greater than a predetermined reference cooling temperature while the high-voltage battery is charged, to determine whether to cool the high-voltage battery, determining whether the temperature of the high-voltage battery is greater than a predetermined failure determination temperature to determine whether the high-voltage battery is abnormal when the temperature of the high-voltage battery is greater than the reference cooling temperature, and maximally driving a battery cooling fan mounted in the vehicle to cool the high-voltage battery when the temperature of the high-voltage battery is greater than the failure determination temperature.

The failure determination temperature may be set to be greater than the reference cooling temperature. The method may further include stopping the operation of the battery cooling fan in response to determining that the high-voltage battery is not slowly charged in the determination of whether the high-voltage battery is charged. The method may further include stopping the operation of the battery cooling fan in response to determining that the temperature of the high-voltage battery is less than the reference cooling temperature in the determination of whether the temperature of the high-voltage battery is greater than a predetermined reference cooling temperature while the high-voltage battery is charged.

The method may further include stopping the operation of the battery cooling fan in response to determining that the temperature of the high-voltage battery is less than the failure determination temperature in the determining whether the temperature of the high-voltage battery is greater than a predetermined failure determination temperature. The method may return to the determination of whether the temperature of the high-voltage battery is greater than a predetermined reference cooling temperature while the high-voltage battery is charged, after maximally driving a battery cooling fan. The method may further include determining whether the vehicle travels before the determination of whether the high-voltage battery is charged, and the determining whether the high-voltage battery is charged may be performed when it is determined that the vehicle is not being driven.

The method may further include determining whether the temperature of the high-voltage battery is greater than a predetermined reference cooling temperature while the vehicle travels to determine whether to cool the high-voltage battery, and operating the battery cooling fan in a multistage manner based on the temperature of the high-voltage battery when the temperature of the high-voltage battery is greater than the reference cooling temperature, and the determination of whether the temperature of the high-voltage battery is greater than a predetermined reference cooling temperature while the vehicle travels and the operation of the battery cooling fan in a multistage manner may be performed when it is determined that the vehicle is being driven. The method may return to the determination of whether the temperature of the high-voltage battery is greater than a predetermined reference cooling temperature while the vehicle travels, after the operation of the battery cooling fan in a multistage manner is performed.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 2 is a flowchart illustrating a method for controlling charging of a plug-in vehicle according to an embodiment of the present invention.

DETAILED DESCRIPTION

Figure 1:
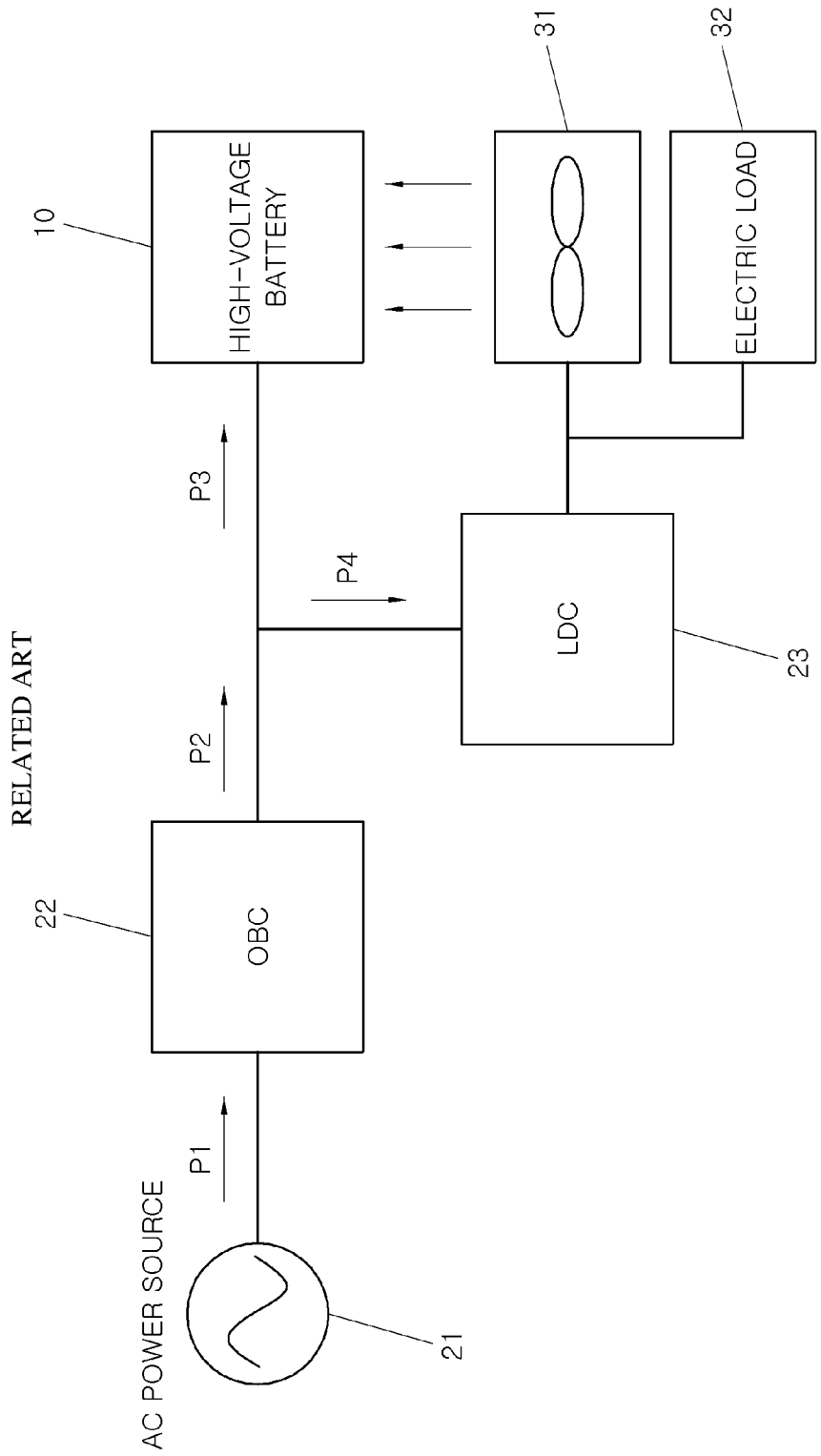
FIG. 1 is a block diagram illustrating a typical structure when a plug-in vehicle is charged.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and exemplary embodiments of the present invention. Hereinafter, a system and method for controlling charging of a plug-in vehicle according to an exemplary embodiment of the present invention will be described in detail with reference to the accompanying drawings.

The method for controlling charging of a plug-in vehicle according to the exemplary embodiment of the present invention is a method of charging a high-voltage battery 10 mounted in a plug-in vehicle by converting AC power into DC power using an OBC 22. The method may be executed by a controller mounted within the vehicle having a processor and a memory.

In particular, the method may include determining whether the high-voltage battery 10 is being charged by the operation of the OBC 22 (S130), determining whether the temperature of the high-voltage battery 10 is greater than a predetermined reference cooling temperature T1 to determine whether to cool the high-voltage battery 10 (S140), determining whether the temperature of the high-voltage battery 10 is greater than a predetermined failure determination temperature T2 to determine whether the high-voltage battery 10 is abnormal when the temperature of the high-voltage battery 10 is greater than the reference cooling temperature T1 (S150), and maximally driving a battery cooling fan 31 mounted in the vehicle to cool the high-voltage battery 10 when the temperature of the high-voltage battery 10 is greater than the failure determination temperature T2 (S170). The maximal driving of the battery cooling fan 31 may refer to operating the fan at a maximum output level.

The method may further include determining whether the vehicle is being driven (S110). In particular, the present invention is capable of operating a battery cooling fan 31 mounted within a vehicle, such as a plug-in hybrid vehicle or an electric vehicle, (hereinafter, referred to as a "plug-in vehicle") driven by the electric power of a high-voltage battery 10, which is mounted in the plug-in vehicle and is charged before the plug-in vehicle travels (is driven or operated), to cool the high-voltage battery 10 while it is being charged. Therefore, the method may determine whether the plug-in vehicle is being driven.

Additionally, the method may include an in-traveling battery cooling determination step S120 that is performed when it is determined that the plug-in vehicle is traveling. In in-traveling battery cooling determination step S120, whether the temperature Tb of the high-voltage battery 10 is greater than a predetermined reference cooling temperature T1 may be determined to determine whether to cool the high-voltage battery 10. Since the high-voltage battery 10 is discharged and heated while the plug-in vehicle is traveling, the temperature of the high-voltage battery 10 is continuously increased. Therefore, whether the temperature of the high-voltage battery 10 is greater than the reference cooling temperature T1 may be determined since it is necessary to cool the high-voltage battery 10 when the temperature of the high-voltage battery 10 is greater than the reference cooling temperature T1.

The method may include a multistage battery cooling fan control step S160 that is performed when the temperature Tb of the high-voltage battery 10 is greater than the reference cooling temperature T1 while the vehicle is being driven in the in-traveling battery cooling determination step S120. In particular, in the multistage battery cooling fan control step S160, the battery cooling fan 31 may be operated in a multistage manner and thus, the power thereof may vary based on the temperature Tb of the high-voltage battery 10. The power of the battery cooling fan 31 may be increased as the temperature Tb of the high-voltage battery 10 is increased.

Further, to determine whether it is necessary to further cool the high-voltage battery 10 after the battery cooling fan is operated (S160), the process may return to the in-traveling battery cooling determination step S120. In addition, the determination of whether the high-voltage battery 10 is being charged by the operation of the OBC 22 (slow charging determination step S130) may be performed in response to determining that the plug-in vehicle is not being driven (S110). The determination of whether the battery is being charged may also include determining whether the high-voltage battery 10 is being charged slowly by the OBC 22 that converts the electric power of an AC power source 21 into DC power to charge the high-voltage battery 10.

Since the slow charging uses the electric power of the high-voltage battery 10 supplied from the outside, the charging may be stopped while the plug-in vehicle is traveling or being driven. Therefore, the slow charging determination step S130 may be performed in response to determining that the vehicle is not traveling (S110). In the determination of whether the temperature of the high-voltage battery 10 is greater than a predetermined reference cooling temperature T1 (S140), whether the temperature Tb of the high-voltage battery 10 is greater than a predetermined reference cooling temperature T1 may be determined to determine whether to cool the high-voltage battery 10 while the high-voltage battery 10 is being charged by the OBC 22. When the temperature Tb of the high-voltage battery 10 is greater than the reference cooling temperature T1, it may be necessary to cool the high-voltage battery 10.

Meanwhile, the reference cooling temperature T1 in the in-charging battery cooling determination step S140 may be set to be equal to the reference cooling temperature T1 in the in-traveling battery cooling determination step S120. In the battery abnormality determination step S150, whether the temperature of the high-voltage battery 10 is greater than a predetermined failure determination temperature T2 may be determined to determine whether the high-voltage battery 10 is abnormal (e.g., operating with an error, failure, malfunction, or the like).

When the high-voltage battery 10 is charged by the OBC 22, the temperature of the high-voltage battery 10 may not be further increased due to heating even though the high-voltage battery 10 has a certain level of temperature, i.e. a temperature greater than the reference cooling temperature T1. The temperature of the high-voltage battery 10 may be reduced even without the operation of the battery cooling fan 31, even though the temperature of the high-voltage battery 10 is greater than the reference cooling temperature T1 during the slow charging of the high-voltage battery 10. Accordingly, whether the temperature Tb of the high-voltage battery 10 is greater than the failure determination temperature T2 may be determined again even when the temperature Tb of the high-voltage battery 10 is greater than the reference cooling temperature T1. When the temperature Tb of the high-voltage battery 10 is greater than the failure determination temperature T2, a failure of the high-voltage battery 10 may be detected, and thus, the high-voltage battery 10 may be cooled to prevent the damage thereof. Therefore, it is necessary to compare the temperature Tb of the high-voltage battery 10 with the failure determination temperature T2. The failure determination temperature T2 may be set to be greater than the reference cooling temperature T1.

In the maximum battery cooling fan driving step S170, the battery cooling fan 31 may be maximally driven when the temperature Tb of the high-voltage battery 10 is greater than the failure determination temperature T2. Since the failure of the high-voltage battery 10 may be detected when the temperature Tb of the high-voltage battery 10 is greater than the failure determination temperature T2, the high-voltage battery 10 may be damaged due to high heat. Therefore, the battery cooling fan 31 may be driven at a maximum level to rapidly cool the high-voltage battery 10. To determine whether it is necessary to cool the high-voltage battery 10 while it is slowly charged after the maximum battery cooling fan driving step S170 is performed, the process may return to the in-charging battery cooling determination step S140.

Furthermore, the method may include stopping the battery cooling fan 31 that is being driven (S180). In particular, the battery cooling fan 31 may be stopped in response to determining that the high-voltage battery 10 is not slowly charged, in response to determining that the temperature Tb of the high-voltage battery 10 is less than the reference cooling temperature T1, or in response to determining that the temperature Tb of the high-voltage battery 10 is less than the failure determination temperature T2. The process may then return to the vehicle traveling determination step S110 after the battery cooling fan stop step S180 is performed.

As described above, in the method for controlling charging of a plug-in vehicle according to the exemplary embodiment of the present invention, the temperature of the high-voltage battery 10 may be gradually decreased while the high-voltage battery 10 is slowly charged, even though the temperature Tb of the high-voltage battery 10 is greater than the reference cooling temperature T1 during the slow charging of the high-voltage battery 10. Accordingly, the high-voltage battery 10 may be cooled without the operation of the battery cooling fan 31 and thus, electric power may be used more effectively to charge the high-voltage battery 10 without being supplied to the battery cooling fan 31 through the LDC 23 for driving the battery cooling fan 31. Therefore, it may be possible to improve the charging efficiency and charging rate of the high-voltage battery 10.

Even when the battery cooling fan 30 is not operated when the temperature Tb of the high-voltage battery 10 is between the reference cooling temperature T1 and the failure determination temperature T2, the temperature of the high-voltage battery 10 is not substantially increased although the cooling rate of the high-voltage battery 10 is slightly delayed. Therefore, the life of the high-voltage battery 10 is prevented from being reduced.

In accordance with a method for controlling charging of a plug-in vehicle according to exemplary embodiments of the present invention, when a high-voltage battery is maintained at a normal level (e.g., without failure) while a plug-in vehicle is slowly charged, it is unnecessary to operate a battery cooling fan and thus, electric power for driving the battery cooling fan is prevented from being consumed while the plug-in vehicle is slowly charged. Therefore, it may be possible to improve charging efficiency and a charging rate. In addition, when the high-voltage battery is abnormally overheated, it may be possible to prevent the high-voltage battery from being damage due to overheating by operating the battery cooling fan.

While the present invention has been described with respect to the specific exemplary embodiments, it will be apparent to those skilled in the art that various changes and modifications may be made without departing from the spirit and scope of the invention as defined in the following claims.

What is claimed is:

1. A method for controlling charging of a plug-in vehicle, to charge a high-voltage battery mounted in the plug-in vehicle by converting alternating current (AC) power into direct current (DC) power using an on-board charger (OBC), comprising:
    determining, by a controller, whether the high-voltage battery is charged by an operation of the OBC;
    determining, by the controller, whether the temperature of the high-voltage battery is greater than a predetermined reference cooling temperature while the high-voltage battery is charged, to determine whether to cool the high-voltage battery;
    determining, by the controller, whether the temperature of the high-voltage battery is greater than a predetermined failure determination temperature to detect a failure of the high-voltage battery when the temperature of the high-voltage battery is greater than the reference cooling temperature;
    operating, by the controller, a battery cooling fan mounted in the vehicle at a maximum level to cool the high-voltage battery when the high-voltage battery is charged and the temperature of the high-voltage battery is greater than the failure determination temperature;
    stopping, by the controller, the operation of the battery cooling fan, in response to determining that the temperature of the high-voltage battery is less than the failure determination temperature; and
    determining, by the controller, whether the vehicle is being driven before determining whether the high-voltage battery is charged,
    wherein the determining of whether the high-voltage battery is charged is performed in response to determining that the vehicle is not being driven.

2. The method of claim 1, wherein the failure determination temperature is greater than the reference cooling temperature.

3. The method of claim 1, further comprising:
    stopping, by the controller, the operation of the battery cooling fan, in response to determining that the temperature of the high-voltage battery is less than the reference cooling temperature.

4. The method of claim 1, wherein the method returns to the determining of whether the temperature of the high-voltage battery is greater than a predetermined reference cooling temperature while the high-voltage battery is charged, after the battery cooling fan is operated at the maximum level.

5. The method of claim 1, further comprising:
    stopping, by the controller, the operation of the battery cooling fan, in response to determining that the high-voltage battery is not charged by the operation of the OBC.

6. The method of claim 5, further comprising:
    operating, by the controller, the battery cooling fan when the temperature of the high-voltage battery is greater than the reference cooling temperature.

7. The method of claim 1, further comprising:
    determining, by the controller, whether the temperature of the high-voltage battery is greater than a predetermined reference cooling temperature while the vehicle is being driven to determine whether to cool the high-voltage battery; and
    operating, by the controller, the battery cooling fan in a multistage manner when the temperature of the high-voltage battery is greater than the reference cooling temperature,
    wherein the determining of whether the temperature of the high-voltage battery is greater than a predetermined reference cooling temperature while the vehicle is being operated and the operation of the battery cooling fan in a multistage manner are performed in response to determining that the vehicle is being driven.

8. The method of claim 7, wherein the method returns to the determining of whether the temperature of the high-voltage battery is greater than a predetermined reference cooling temperature while the vehicle is being driven, after operating the battery cooling fan in a multistage manner.

9. The method of claim 7, further comprising:
    stopping, by the controller, the operation of the battery cooling fan, in response to determining that the temperature of the high-voltage battery is less than the reference cooling temperature.

10. A system for controlling charging of a plug-in vehicle, to charge a high-voltage battery mounted in the plug-in vehicle by converting alternating current (AC) power into direct current (DC) power using an on-board charger (OBC), comprising:
    a memory configured to store program instructions; and
    a processor configured to execute the program instructions, the program instructions when executed configured to:
        determine whether the high-voltage battery is charged by operation of the OBC;
        determine whether the temperature of the high-voltage battery is greater than a predetermined reference cooling temperature while the high-voltage battery is charged, to determine whether to cool the high-voltage battery;
        determine whether the temperature of the high-voltage battery is greater than a predetermined failure determination temperature to detect a failure of the high-voltage battery when the temperature of the high-voltage battery is greater than the reference cooling temperature;
        operate a battery cooling fan mounted in the vehicle at a maximum level to cool the high-voltage battery when the high-voltage battery is charged and the temperature of the high-voltage battery is greater than the failure determination temperature;

stop the operation of the battery cooling fan, in response to determining that the temperature of the high-voltage battery is less than the failure determination temperature;

determine whether the vehicle is being driven before determining whether the high-voltage battery is charged, wherein the determining of whether the high-voltage battery is charged is performed in response to determining that the vehicle is not being driven.

11. The system of claim 10, wherein the failure determination temperature is greater than the reference cooling temperature.

12. The system of claim 10, wherein the program instructions when executed are further configured to:

stop the operation of the battery cooling fan, in response to determining that the high-voltage battery is not charged by the operation of the OBC.

13. The system of claim 10, wherein the program instructions when executed are further configured to:

stop the operation of the battery cooling fan, in response to determining that the temperature of the high-voltage battery is less than the reference cooling temperature.

14. The system of claim 12, wherein the program instructions when executed are further configured to:

operate the battery cooling fan when the temperature of the high-voltage battery is greater than the reference cooling temperature.

15. The system of claim 10, wherein the program instructions when executed are further configured to:

return to the determining of whether the temperature of the high-voltage battery is greater than a predetermined reference cooling temperature while the high-voltage battery is charged, after the battery cooling fan is operated at the maximum level.

16. The system of claim 10, wherein the program instructions when executed are further configured to:

determine whether the temperature of the high-voltage battery is greater than a predetermined reference cooling temperature while the vehicle is being driven to determine whether to cool the high-voltage battery; and operate the battery cooling fan in a multistage manner when the temperature of the high-voltage battery is greater than the reference cooling temperature, wherein the determining of whether the temperature of the high-voltage battery is greater than a predetermined reference cooling temperature while the vehicle is being operated and the operation of the battery cooling fan in a multistage manner are performed in response to determining that the vehicle is being driven.

17. The system of claim 16, wherein the program instructions when executed are further configured to:

return to the determining of whether the temperature of the high-voltage battery is greater than a predetermined reference cooling temperature while the vehicle is being driven, after operating the battery cooling fan in a multistage manner.

18. The system of claim 16, wherein the program instructions when executed are further configured to:

stop the operation of the battery cooling fan, in response to determining that the temperature of the high-voltage battery is less than the reference cooling temperature.

\* \* \* \* \*